April 7, 1959
A. KURT
2,880,960
COMBINED VALVE AND CHUCK
Filed May 26, 1955
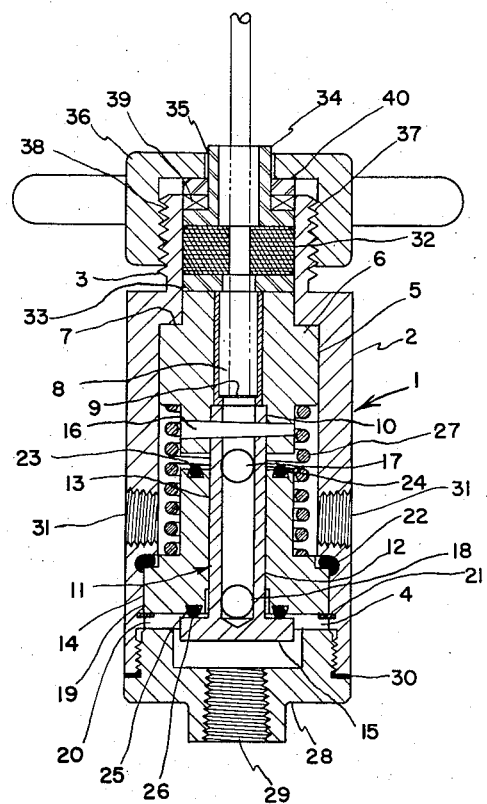
INVENTOR.
ANTON KURT
BY
*James M. Nickels*
ATTORNEY

United States Patent Office 2,880,960
Patented Apr. 7, 1959

2,880,960
COMBINED VALVE AND CHUCK

Anton Kurt, Red Bank, N.J., assignor to Bendix Aviation Corporation, Eatontown, N.J., a corporation of Delaware Application May 26, 1955, Serial No. 511,269

2 Claims. (Cl. 251—149)

The present invention relates to a combined valve and chuck for use on exhaust machines.

In the production of electron tubes, it is necessary that they be evacuated of air, whether they will be vacuum or gas filled. Heretofore, a number of tubes have been positioned on a manifold connected to an exhaust system. In changing the tubes, the vacuum manifold is opened to atmospheric contamination. Further, in the event of a leak or a faulty tip-off in one of the tubes, the remainder of the tubes on the manifold are lost due to poisoning of the cathode by atmosphere.

The present invention provides a novel valve for use with an exhaust machine where, at no time, is the vacuum manifold open to atmosphere. Further, a leak or faulty tip-off will not affect the other tubes on the line.

It is an object of the invention to provide a novel valve.

Another object of the invention is to provide a combination valve and chuck.

Another object of the invention is to provide improved means for exhausting tubes.

Another object of the invention is to provide an improved valve for a vacuum manifold.

The above and other objects and features of the invention will appear more fully hereinafter from a consideration of the following description taken in connection with the accompanying drawing wherein one embodiment of the invention is illustrated by way of example.

In the drawing, the single figure of the drawing is a sectional view of a valve illustrating one embodiment of the invention.

Reference is now made to the drawing wherein a valve is indicated generally by the numeral 1 and is adapted for use on a vacuum manifold (not shown). The valve 1 has a housing 2 which has a reduced section 3 on one end thereof and a counterbore section 4 in the other end.

A piston member 5 has a shoulder portion 6 proportioned for a sliding fit inside the housing 2. A shoulder 7 in the housing 2 serves as a stop to limit the upward movement of the piston 5. An opening 8 extends axially through the piston 5. A screen 9 may be installed in the opening 8 to prevent broken glass from being drawn into the vacuum system. The piston 5 has a counterbored section 10 concentric with the opening 8 and adapted to receive a valve member 11. The valve member 11 has a cylindrical portion 12 extending axially through opening 13 in valve seat member 14 and terminating in a flange portion 15. The cylindrical portion 12 is secured to the piston 5 by a pin 16 or in any other conventional manner. Ports 17 and 18 are provided in the cylindrical portion 12.

The valve seat member 14 has a shoulder portion 19 adapted to fit into a counterbore section 20 of the housing 2 and is secured therein by a snap ring 21. An O ring 22 is provided between the shoulder portion 19 and the end of the counterbore section 20 to provide a seal therebetween. A circumferential groove 23, adapted, to receive an O ring 24 in the valve seat member forms an upper valve seat to coact with the piston member 5. Another circumferential groove 25, adapted to receive an O ring 26, forms a lower valve seat to coact with the flange 15. A spring 27 biases the piston 5 against the shoulder 6 and thereby the flange 15 into engagement with the O ring 26. An end cap 28 is screwthreaded in the housing 2 and has a threaded opening 29 adapted for mounting on an exhaust manifold (not shown). A bushing 30 is provided between the cap 28 and the housing 2. Threaded openings 31 may be provided in the housing 2 for connections to a gas system (not shown) and leak detector (not shown).

Within the reduced section 3 of the housing 2 a compressionable washer 32 of rubber or other suitable material is positioned between a washer 33 and a flanged cylinder 34. The cylinder 34 extends through an opening 35 in a hand cap screw 36 which has a threaded portion 37 adapted to engage a threaded portion 38 on the section 3. A thrust bearing 39 and washer 40 are positioned between the flanged portion of the cylinder 34 and the hand cap screw 36.

In the operation, the tubulation of a vacuum tube under exhaust is inserted into the compression washer 32. As the hand cap screw 36 is tightened, the washer 32 is compressed to form a seal around the tubulation. As the cap screw 36 is tightened further, the bias of the spring 27 is overcome and the piston 5 compresses the O ring 24, thereby sealing off the port 17 from communication with the openings 31. At the same time, the valve member 11 is moved axially thereby moving the flange 15 from contact with the O ring 26. This opens the port 18 into communication with the opening 29 thus connecting the tube to the vacuum system.

After the tube has been exhausted, the hand cap member is loosened and the spring 27 biases the piston 5 which moves the flange 15 so that it compresses the O ring 26 to seal off the port 18. Also, the piston 5 moves away from the O ring 24 thereby opening the port 17. Gas may then be supplied to the tube from the opening 31.

If a tube is to be a vacuum tube, the tubulation is tipped off before loosening of the hand cap member. If gas filled, the seal is made before the cap screw 5 has been loosened sufficiently to release the tubulation but has been loosened enough to close the port 18 and open the port 17.

While only one valve has been illustrated, it is understood that a plurality of valves may be used on the vacuum manifold. Thus a novel valve is provided, whereby, the vacuum manifold is, at no time, opened to atmospheric contamination, permits individual processing of tubes, and provides means for selectively filling the tubes with various types of gases without affecting the main vacuum system.

Although only one embodiment of the invention has been illustrated and described, various changes in the form and relative arrangement of the parts may be made to suit requirements.

What is claimed is:

1. A combination valve and compression chuck for use in processing electron tubes having an exhaust tubulation thereon, comprising a housing having two inlet ports and an outlet port, a valve seat member positioned between said two inlet ports and having an opening therein forming a communicating passageway between said two inlet ports, a piston member positioned between said inlet ports and said outlet port and having an opening therein forming a communicating passageway between one of said inlet ports and said outlet port, a valve stem member having one end secured to said piston member and extending through the opening in said valve seat member and terminating in a valve head, spring means biasing said piston member in one direction to engage said valve head with said valve seat member to cut off communication with the other of said inlet ports, a compressible member positioned between said piston member and said outlet port and having an opening therein for receiving an exhaust tubulation, and means for progressively compressing said compressible member to form a seal with said tubulation then move said piston into engagement with said valve seat member to close off said one of said inlet ports and to move said valve head from engagement with said valve seat member.

2. A combined valve and compression chuck for use in evacuating tubes, comprising a housing having two inlet ports and an outlet port, a valve seat member positioned between said inlet ports and having a passageway extending axially therethrough connecting said inlet ports, a piston member movable axially in said housing and having a passageway extending axially therethrough and connecting one of said inlet ports with said outlet port, a valve stem member having one end secured to said piston member and a valve head on the other end thereof, said valve stem extending through said passageway, spring means biasing said piston member in one direction to engage said valve head with said valve seat member to cutoff communication with the other of said inlet ports, and means including a compressible member surrounding said outlet port for forming a seal around a tubulation of the tube being evacuated and for actuating said piston member into engagement with said valve seat member to cut off communication with said one of said inlet ports and to move said valve head from engagement with said valve seat member.

References Cited in the file of this patent

UNITED STATES PATENTS

| | | |
|---|---|---|
| 645,696 | Topp | Mar. 20, 1900 |
| 678,841 | MacLearn | July 16, 1901 |
| 780,754 | Junggren | Jan. 24, 1905 |
| 906,331 | Struble | Dec. 8, 1908 |
| 1,172,833 | Ricker | Feb. 22, 1916 |
| 1,299,398 | Kahr | Apr. 1, 1919 |
| 1,532,434 | Mueller | Apr. 7, 1925 |
| 1,579,073 | Bullock | Mar. 30, 1926 |
| 1,779,319 | Jennings | Oct. 21, 1930 |
| 1,834,033 | Michelin | Dec. 1, 1931 |
| 2,648,349 | McGarry | Aug. 11, 1953 |
| 2,708,588 | Prah | May 17, 1955 |

FOREIGN PATENTS

| | | |
|---|---|---|
| 540,069 | France | Apr. 11, 1922 |